(12) United States Patent
Arimoto et al.

(10) Patent No.: US 6,686,048 B1
(45) Date of Patent: Feb. 3, 2004

(54) COMPOSITE CARBONACEOUS HEAT INSULATOR

(75) Inventors: Yoshihiro Arimoto, Chiba (JP); Yukihiro Sibuya, Fukushima (JP); Masanori Kobayashi, Fukushima (JP); Shigeki Iwamoto, Tokyo (JP)

(73) Assignee: Kureha Kagaku Kogyo K. K., Tokyo (JP)

( * ) Notice: Subject to any disclaimer, the term of this patent is extended or adjusted under 35 U.S.C. 154(b) by 0 days.

(21) Appl. No.: 09/979,659

(22) PCT Filed: May 24, 2000

(86) PCT No.: PCT/JP00/03302

§ 371 (c)(1),
(2), (4) Date: Nov. 26, 2001

(87) PCT Pub. No.: WO00/73243

PCT Pub. Date: Dec. 7, 2000

(30) Foreign Application Priority Data

May 26, 1999 (JP) ............................................. 11-146247

(51) Int. Cl.$^7$ ................................................. B32B 9/00
(52) U.S. Cl. ....................... 428/408; 428/218; 428/323; 428/367; 428/402; 428/403; 428/913
(58) Field of Search .................................. 428/408, 323, 428/402, 403, 218, 367, 913; 442/414; 264/257, 29.5; 427/249.1, 249.2

(56) References Cited

U.S. PATENT DOCUMENTS 4,454,190 A * 6/1984 Katagiri ....................... 428/281
5,766,745 A * 6/1998 Smith et al. ................. 428/218
5,954,875 A * 9/1999 Kato et al. ................... 117/217

FOREIGN PATENT DOCUMENTS

| JP | 54152073 | * 11/1979 |
| JP | 01-122976 | * 5/1989 |
| JP | 10072292 | * 3/1998 |

* cited by examiner

*Primary Examiner*—Deborah Jones
*Assistant Examiner*—Abraham Bahta
(74) *Attorney, Agent, or Firm*—Kanesaka & Takeuchi

(57) ABSTRACT

A composite carbonaceous heat insulator which comprises a carbonaceous heat-insulating member having a bulk density of 0.1 to 0.4 g/cm$^3$, a carbonaceous protecting layer having a bulk density of 0.3 to 2.0 g/cm$^3$ and comprising a carbon fiber structure and a thermally decomposed carbon penetrated into the structure, and a thermally decomposed carbon coating layer having a bulk density higher than that of the carbonaceous protecting layer, wherein the above carbonaceous protecting layer is jointed to at least a part of the carbonaceous heat-insulating member to form a jointed body, and the thermally decomposed carbon coating layer is formed at least on the face of carbonaceous heat-insulating member in the surface of the jointed body; and a method for manufacturing the insulator. The heat insulator is reduced with respect to the depletion, deterioration and pulverization during the use thereof, while maintaining excellent insulating characteristics.

9 Claims, No Drawings

COMPOSITE CARBONACEOUS HEAT INSULATOR

FIELD OF THE INVENTION

The present invention relates to carbonaceous heat insulators and, particularly, to a composite carbonaceous heat insulator suitable for use in a furnace such as a monocrystal pulling-up furnace or ceramic sintering furnace and a method of making the insulator.

BACKGROUND OF THE INVENTION

The carbonaceous fiber heat insulator has excellent heat insulation and low heat capacity and is used widely as a heat insulator for a high temperature furnace such as a monocrystal pulling-up furnace, vacuum deposition furnace, or ceramic sintering furnace.

Most of such a carbonaceous fiber heat insulator is made by molding. See Japanese patent application Kokai No. 50-35930. The molded heat insulator is made by impregnating a carbonaceous fiber felt with a resin having a high carbonization rate, laminating and compressing the felt to form a molded material, and carbonizing the molded material to give it an independent shape.

The carbonaceous fiber heat insulator withstands high temperatures up to 3000 degrees C. in an inert atmosphere for its high heat resistance and low vapor pressure. In the practical atmosphere, however, the carbon fibers of the heat insulator wear and deteriorate by reaction with the oxidizing and/or metallic gases generated in the furnace. In the ceramics sintering or silicon monocrystal pulling-up furnace, for example, the carbonaceous fibers react with the gasses, such as silicon oxide (SiO), generated in the furnace and wear and become brittle and powder, with the metal adhering to the fiber surfaces. Under such conditions, the carbonaceous fiber heat insulator not only has poor heat insulation and useful life but also produces fine carbon dust in the furnace, contaminating the product.

For this reason, the heat insulator for the silicon monocrystal pulling-up furnace is housed in a graphite case to keep the generated gases from contacting with the heat insulator. The heat capacity of the graphite case, however, is so high that the thermal efficiency and operation rate of the furnace become low.

To solve such a problem, it has been proposed to form a thermally decomposed carbon film on the surface of porous carbonaceous felt or impregnating a carbonaceous felt with a thermally decomposed carbon to provide a carbonaceous fiber heat insulator. See Japanese patent application Kokai No. 1-167210.

In the method of JP210, however, if the amount of thermally decomposed carbon impregnated is too large, the carbonaceous fiber heat insulator has low heat insulation. Also, if a film of the thermally decomposed carbon is formed on the surface, the amount of carbon impregnated is so small that the depletion and pulverization of the heat insulator become large.

Accordingly, it is an object of the invention to provide a carbonaceous heat insulator with low depletion, deterioration, and pulverization in use and high heat insulation and a method of making it.

DISCLOSURE OF THE INVENTION

According to the invention there is provided a composite carbonaceous heat insulator comprising a carbonaceous heat-insulating member having a bulk density of 0.1 to 0.4 $g/cm^3$; a carbonaceous protecting layer made by penetrating a thermally decomposed carbon into a carbon fiber structure and having a bulk density of 0.3 to 2.0 $g/cm^3$; and a thermally decomposed carbon coating layer having a bulk density higher than that of the carbonaceous protecting layer, wherein the carbonaceous protecting layer is joined with at least part of a surface of the carbonaceous heat-insulating member to form a joined body; the thermally decomposed carbon coating layer is formed on at least a face of the carbonaceous heat-insulating member of the joined body.

It is preferred that the composite carbonaceous heat insulator further comprises a dense carbonaceous intermediate layer between the carbonaceous heat-insulating member and the carbonaceous protecting layer of the joined body.

Also, it is preferred that the composite carbonaceous heat insulator further comprises a dense carbonaceous surface layer between the thermally decomposed carbon coating layer and the carbonaceous heat-insulating member.

The dense carbonaceous intermediate and surface layers are made by forming a dense carbon forming composition consisting of a graphite flake and a binder component able to be carbonized by heat and carbonizing the composition.

According to another aspect of the invention there is provided a method of making the composite carbonaceous heat insulator, which comprises the steps of joining the carbonaceous protecting layer made by penetrating the thermally decomposed carbon into the carbon fiber structure to at least part of a surface of the carbonaceous heat-insulating member made of a carbon fiber molding to form a joined body; and form the thermally decomposed carbon coating layer on at least a face of the carbonaceous heat-insulating member or a face of the carbonaceous heat-insulating member and/or the carbonaceous protecting layer. Alternatively, the thermally decomposed coating layer is formed on the carbonaceous heat-insulating member after the dense carbon surface layer is formed.

According to still another aspect of the invention there is provided a method of making a composite carbonaceous heat insulator, comprising the steps of joining the carbonaceous heat-insulating member made of a carbon fiber molding and the carbon fiber structure to form a joined body, forming a dense carbonaceous surface layer on a surface of the carbonaceous heat-insulating member and forming the thermally decomposed carbon coating layer on a surface of the carbonaceous heat-insulating member while penetrating the terminally decomposed carbon into the carbon fiber structure.

According to the invention, the carbonaceous heat-insulating member with low bulk density maintains the heat insulation while the carbonaceous protecting layer with high bulk density suppresses the depletion, deterioration, and pulverization during the use. The thermally decomposed carbon penetrates into the carbonaceous protecting layer so that the reactive gases hardly enter and the reaction resistance is high. Since the thermally decomposed carbon coating layer covers the surface, the composite carbonaceous heat insulator is reduced in the depletion and deterioration and spread of the carbon powder is prevented.

DESCRIPTION OF THE PREFERRED EMBODIMENTS

The composite carbonaceous heat insulator according to the invention comprises a carbonaceous heat-insulating member, a carbonaceous protecting layer made by penetrating a carbon fiber structure with thermally decomposed carbon, and a thermally decomposed carbon coating layer having a bulk density higher than that of the carbonaceous protecting layer. The carbonaceous protecting layer is joined with at least a part of the carbonaceous heat-insulating member to form a joined body such that the thermally decomposed carbon coating layer is formed on at least the carbonaceous heat-insulating member.

It is preferred that the carbonaceous heat-insulating member and the carbonaceous protecting layer are joined via a dense carbonaceous intermediate layer having low gas permeability.

The carbonaceous heat-insulating member is any porous carbonaceous material having a low bulk density. A preferred example is a carbon fiber molded heat-insulating material.

The carbon fiber molded heat-insulating material is made by penetrating a felt of carbon fiber, such as pitch carbon fiber, rayon carbon fiber, or polyacrylonitrile carbon fiber, with a binder, such as phenol resin, or furan resin, and molding and hardening the felt, carbonizing the binder to join the carbon fibers with the binder carbide.

The carbonaceous heat-insulating member should have a bulk density of 0.1–0.4 $g/cm^3$ in view of the heat insulation, strength, and plasticity. If the bulk density is lower than the lower limit, the strength and plasticity become poor while, if it is higher than the higher limit, the heat insulation is lowered. For the heat insulation and thermal capacity, it is preferred that the bulk density is in the range between 0.13 and 0.3 $g/cm^3$.

The carbonaceous protecting layer is made by penetrating the thermally decomposed carbon into the carbon fiber structure. The "carbon fiber structure" herein used means a porous structure made of carbon fiber. An example of the carbon fiber structure is a molded body made by impregnating a carbon fiber felt or cloth with a binder, such as a phenol resin, to join the carbon fibers with the resin binder, providing a molded body, heating the molded body to carbonize the binder, joining the carbon fibers with the binder carbide. The preferred carbon fibers are the same as those of the carbon fiber molded heat-insulating material. The thermally decomposed carbon is penetrated into the carbon fiber structure by heating the carbon fiber structure to temperatures between 800 and 2000 degrees C., bringing it into contact with a hydrogen carbide gas of a 1- to 6-carbon chain or ring, depositing the carbon produced by thermal decomposition in a gaseous phase on the surfaces of the carbon fibers of the carbon fiber structure. This method is well known as chemical vapor deposition (CVD).

It is preferred that the bulk density of the carbonaceous protecting layer is in the range between 0.3 and 2.0 $g/cm^3$. When the bulk density is below 0.3 $g/cm^3$, the amount of thermally decomposed carbon penetrated is too small to keep the carbonaceous heat-insulating material from reacting with the furnace gases while when the bulk density is above 2.0 g/cm, not only it takes too long to penetrate the thermally decomposed carbon but also the carbonaceous protecting layer can be cracked. It is more preferred that the bulk density of the carbonaceous protecting layer is in the range between 0.4 and 1.5 $g/cm^3$.

It is preferred that the thickness of the carbonaceous protecting layer is in the range between 0.5 and 15 mm. If the thickness is below the lower limit, the protective layer does not work while if it is above the upper limit, the heat insulation is lowered and the weight of the heat-insulating material becomes so large that the thermal efficiency of the furnace in raising and lowering the temperature is decreased. The more preferred thickness of the carbonaceous protecting layer is in the range between 1 and 10 mm.

The carbonaceous heat-insulating member and the carbonaceous protecting layer are joined to provide the composite carbonaceous heat insulator. It is preferred that the carbonaceous heat-insulating member and the carbonaceous protecting layer are joined via a dense carbonaceous intermediate layer through which no gas can pass. The dense carbonaceous intermediate layer is made by, for example, carbonizing a dense carbon forming composition consisting of a graphite flake and a binder capable of being carbonized by heat. More specifically, it is made by coating the dense carbon forming composition on the joint between the carbonaceous heat-insulating member and the carbonaceous protecting layer to bond them and heating it to carbonize the binder component, forming the dense carbonaceous intermediate layer between the carbonaceous heat-insulating member and the carbonaceous protecting layer. Alternatively, it is made by bonding the carbonaceous heat-insulating member and the carbonaceous protecting layer with a binder, such as a phenol resin or furan resin, and heating it to carbonize the binder for porous bonding.

The preferred binder component is a phenol or furan resin that has a high carbonization rate. The dense carbon forming composition may contain a solvent, such as an alcohol or ketone, for solving the binder component. The dense carbon forming composition may contain carbon powder in addition to graphite flake. When it is coated on the carbonaceous heat-insulating member, the graphite flake is oriented in parallel to the surface of the carbonaceous heat-insulating member to promote the density, increasing the heat insulation and gas impermeability of the dense carbonaceous intermediate layer. The preferred diameter of the graphite flake is in the range between 1 and 200 $\mu$m, and the amount mixed with 100 parts by weight of the binder component is 20 to 300, preferably, 30 to 200 parts by weight.

The composite carbonaceous heat insulator is made by forming, by CVD, a thermally decomposed carbon coating layer on the surface of at least the carbonaceous heat-insulating member of the joined body. It is preferred to coat and carbonize the dense carbon forming composition on the surface of the carbonaceous heat-insulating member to form the dense carbonaceous surface layer and form the thermally decomposed carbonaceous coating layer on the dense carbonaceous surface layer. The dense carbonaceous surface layer prevents the thermally decomposed carbon from penetrating into the carbonaceous heat-insulating member to form efficiently the thermally decomposed carbon coating layer only on the surface.

Alternatively, the composite carbonaceous heat insulator is formed by joining the carbonaceous heat-insulating member and the carbon fiber structure to form a joined body and forming a thermally decomposed carbon coating layer on the surface of the carbonaceous heat-insulating member while penetrating the thermally decomposed carbon into the carbon fiber structure to form a protective layer. In this method, generation of the thermally decomposed carbon by CVD is employed only once.

The preferred thickness of the thermally decomposed carbon coating layer is in the range between 50 and 500 $\mu$m.

The dense carbonaceous surface layer and the dense carbonaceous intermediate layer prevent the thermally decomposed carbon from penetrating into the carbonaceous heat-insulating member during the generation of the thermally decomposed carbon. It is preferred that the bulk density of the dense carbonaceous surface and intermediate layers is at least 1.5 g/cm$^3$.

Coating the entire surface of the carbonaceous heat-insulating member with the thermally decomposed carbon coating layer facilitates vacuum operation of the vacuum furnace or prevents deformation of the heat-insulating member caused by expansion and contraction of the gases within the heat-insulating member, making it possible to provide perforations in the composite carbonaceous heat insulator up to the carbonaceous heat-insulating member.

EXAMPLES

A molded heat-insulating material (carbonaceous heat-insulating member) made of a pitch carbon fiber felt (100 mm wide×100 mm long×35 mm thick) having a bulk density of 0.16 g/cm$^3$ and a carbon fiber felt (5 mm thick) impregnated with 10 parts by weight of phenol resin for 100 parts by weight of the felt (carbon fiber structure) are joined by a dense carbon forming composition consisting of a graphite flake, furan resin, and a solvent to provide a joined body. The dense carbon forming composition is coated over the entire surface of the molded heat-insulating member of the joined body. After hardened, it is carbonized to form the dense carbonaceous intermediate and surface layers.

Then, the thermally decomposed carbon coating layer is formed by CVD on the dense carbonaceous surface layer while the thermally decomposed carbon is penetrated into the carbon fiber felt to form the carbonaceous protecting layer for providing the composite carbonaceous heat insulator.

In the resulting composite carbonaceous heat insulator, the 5-mm felt layer (protective layer) contained the thermally decomposed carbon penetrated and the carbon fibers had a coating having a thickness of 10 to 20 mm consisting of a plurality of concentric layers. The bulk density of the felt layer (protective layer) was 0.8 g/cm$^3$. The carbonaceous heat-insulating member had little thermally decomposed carbon penetrated thereinto and, on the surface, a thermally decomposed carbon coating having a thickness of 30 to 50 μm.

The heat-insulator was tested in the electric furnace at 600 degrees C. with an air flow (2 L/min) for oxidation resistance.

The following heat insulators were tested for comparison.

Heat insulator (a): A molded heat insular that is the same as the carbonaceous heat-insulating member.

Heat insulator (b): The dense carbon forming composition is coated on the heat insulator (a). After hardened, it is carbonized to form only the dense carbonaceous surface layer.

The results showed that the time when the weight reduction by oxidation of the composite carbonaceous heat insulator reached 10% is approximately 10 times the time of the heat insulator (a) and approximately five times the time of the heat insulator (b), confirming that the composite carbonaceous heat insulator had high oxidation resistance.

Applicability to Industries

As has been described above, the composite carbonaceous heat insulator according to the invention comprises the carbonaceous heat-insulating member having a bulk density of 0.1 to 0.4 g/cm$^3$, a carbonaceous protecting layer having a bulk density of 0.3 to 2.0 g/cm$^3$ made by penetrating the thermally decomposed carbon into the carbon fiber structure, and a thermally decomposed carbon coating layer having a bulk density higher than that of the carbonaceous protecting layer such that the carbonaceous protecting layer is joined with at least a part of the surface of the carbonaceous heat-insulating member to form a joined body and the thermally decomposed carbon coating layer is formed at least on the carbonaceous heat-insulating member so that the carbonaceous heat-insulating member with a low bulk density keeps the heat insulation characteristic while the carbonaceous protecting layer with high bulk density suppresses the depletion, deterioration, and pulverization of the carbonaceous heat-insulating member. The thermally decomposed carbon coating covers the surface of the composite carbonaceous heat insulator so that the depletion and deterioration of the composite carbon heat insulator are reduced and spread of the carbon power is prevented.

What is claimed is:

1. A composite carbonaceous heat insulator comprising:
   a carbonaceous heat-insulating member having a bulk density of 0.1 to 0.4 g/cm$^3$;
   a carbonaceous protecting layer made by penetrating a thermally decomposed carbon into a carbon fiber structure and having a bulk density of 0.3 to 2.0 g/cm$^3$; and
   a thermally decomposed carbon coating layer having a bulk density higher than that of said carbonaceous protecting layer, wherein
   said carbonaceous protecting layer is joined with part of a surface of said carbonaceous heat-insulating member to form a joined body;
   said thermally decomposed carbon coating layer is formed on at least a face of said carbonaceous heat-insulating member of said joined body.

2. The composite carbonaceous heat insulator according to claim 1, which further comprises a dense carbonaceous intermediate layer between said carbonaceous heat-insulating member and said carbonaceous protecting layer of said joined body.

3. The composite carbonaceous heat insulator according to claim 2, wherein said dense carbonaceous intermediate layer is made by forming a dense carbon forming composition consisting of a graphite flake and a binder component able to be carbonized by heat and carbonizing said composition.

4. The composite carbonaceous heat insulator according to claim 2, which further comprises a dense carbonaceous surface layer between said thermally decomposed carbon coating layer and said carbonaceous heat-insulating member.

5. The composite carbonaceous heat insulator according to claim 4, wherein said dense carbonaceous surface layer is made by forming a dense carbon forming composition consisting of a graphite flake and a binder component able to be carbonized by heat and carbonizing said composition.

6. The composite carbonaceous heat insulator according to claim 1, which further comprises a dense carbonaceous surface layer between said thermally decomposed carbon coating layer and said carbonaceous heat-insulating member.

7. The composite carbonaceous heat insulator according to claim 6, wherein said dense carbonaceous surface layer is made by forming a dense carbon forming composition consisting of a graphite flake and a binder component able to be carbonized by heat and carbonizing said composition.

8. The composite carbonaceous heat insulator according to one of claims 1–7, wherein said carbonaceous protecting layer has a thickness of 0.5 to 15 mm.

9. The composite carbonaceous heat insulator according to one of claims 1–7, wherein said thermally decomposed coating layer has a thickness of 50 to 500 um.

* * * * *